(12) United States Patent
Tedesco et al.

(10) Patent No.: US 6,661,945 B2
(45) Date of Patent: Dec. 9, 2003

(54) MULTI-BAND WAVELENGTH DISPERSIVE DEVICE FOR USE IN DENSE WAVELENGTH DIVISION MULTIPLEXING (DWDM) NETWORKS

(75) Inventors: James M. Tedesco, Livonia, MI (US); James Arns, Saline, MI (US)

(73) Assignee: Kaiser Optical Systems, Inc., Ann Arbor, MI (US)

(*) Notice: Subject to any disclaimer, the term of this patent is extended or adjusted under 35 U.S.C. 154(b) by 208 days.

(21) Appl. No.: 09/855,056

(22) Filed: May 14, 2001

(65) Prior Publication Data

US 2002/0044725 A1 Apr. 18, 2002

Related U.S. Application Data

(63) Continuation-in-part of application No. 09/560,595, filed on Apr. 28, 2000, now Pat. No. 6,449,066.
(60) Provisional application No. 60/203,971, filed on May 12, 2000.

(51) Int. Cl.[7] .................................................. G02B 6/28
(52) U.S. Cl. ............................ 385/24; 385/31; 385/36; 385/37
(58) Field of Search ........................... 385/24, 36, 37, 385/31

(56) References Cited

U.S. PATENT DOCUMENTS

| | | | |
|---|---|---|---|
| 5,537,432 A | 7/1996 | Mehuys et al. | 372/50 |
| 5,555,253 A | 9/1996 | Dixon | 372/29 |
| 5,572,542 A | 11/1996 | Dixon | 372/92 |
| 5,650,835 A * | 7/1997 | Matic | 359/573 |
| 5,651,018 A | 7/1997 | Mehuys et al. | 372/50 |
| 5,657,120 A | 8/1997 | Smith | 356/301 |
| 5,832,011 A | 11/1998 | Kashyap | 372/23 |
| 5,835,522 A | 11/1998 | King et al. | 372/97 |
| 5,856,869 A | 1/1999 | Cooper et al. | 356/301 |
| 5,946,333 A | 8/1999 | Kappeler | 372/38 |
| 5,993,073 A | 11/1999 | Hamakawa et al. | 385/88 |
| 6,028,667 A | 2/2000 | Smith et al. | 356/301 |
| 6,100,975 A | 8/2000 | Smith et al. | 356/301 |
| 6,101,210 A | 8/2000 | Bestwick et al. | 372/96 |
| 6,192,059 B1 | 2/2001 | Karioja et al. | 372/20 |
| 6,205,161 B1 | 3/2001 | Kappeler | 372/38.1 |
| 6,226,311 B1 | 5/2001 | Meliga et al. | 372/102 |
| 6,275,630 B1 * | 8/2001 | Yang et al. | 385/37 |
| 6,343,170 B1 * | 1/2002 | Sela | 385/37 |
| 6,385,366 B1 * | 5/2002 | Lin | 385/24 |
| 6,421,179 B1 * | 7/2002 | Gutin et al. | 359/573 |
| 6,501,877 B1 * | 12/2002 | Weverka et al. | 385/31 |
| 2002/0043616 A1 * | 4/2002 | May | 250/226 |

OTHER PUBLICATIONS

D. Bishop, C. Giles, S. Das, "The Rise of Optical Switching," Scientific American, Jan. 2001, pp. 88–99.

* cited by examiner

Primary Examiner—Michael P. Stafira
Assistant Examiner—Juan Valentin, II
(74) Attorney, Agent, or Firm—Gifford, Krass, Groh, Sprinkle, Anderson & Citkowski, PC

(57) ABSTRACT

Multiplexed grating and grating/prism devices are particularly suited to DWDM optical telecommunications networks, finding utility in optical spectrum analyzers (OSAs) and fiber multiplexer/demultiplexers. The invention may be used to address both single- and dual-band configurations through adjustment of the grating, detector array, and/or inclusion of a fiber-optic switch. As a dual-band OSA covering the C- and L-bands, a device according to the invention may be used to replace two separate OSAs like those currently in production, at only a modest increase in cost relative to a single-band OSA.

4 Claims, 2 Drawing Sheets

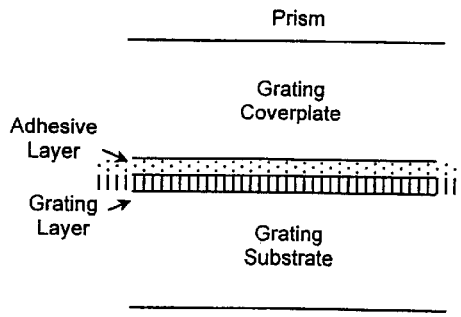
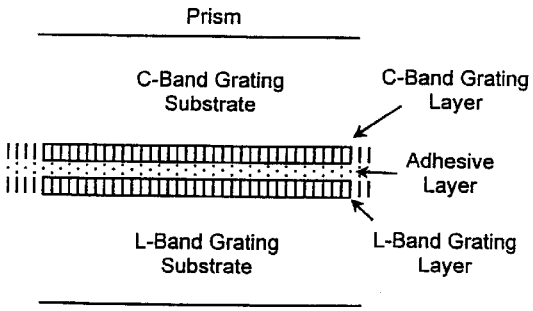
FIGURE 3A            FIGURE 3B
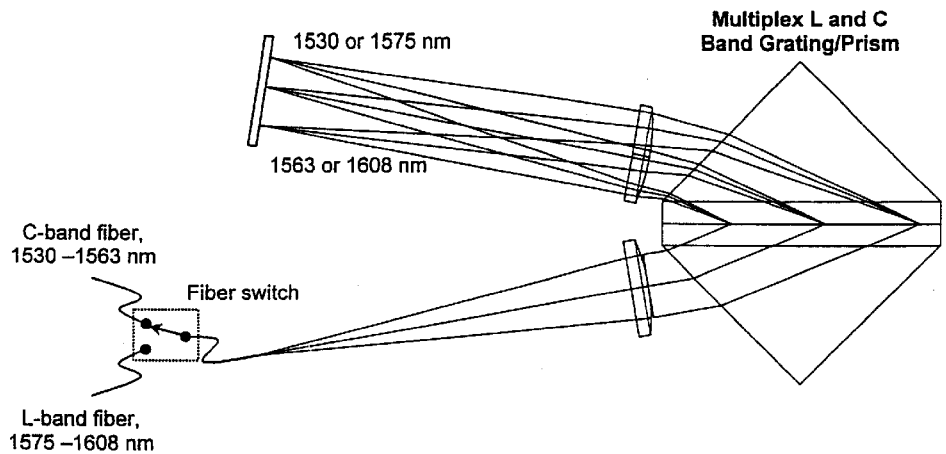
FIGURE 4

MULTI-BAND WAVELENGTH DISPERSIVE DEVICE FOR USE IN DENSE WAVELENGTH DIVISION MULTIPLEXING (DWDM) NETWORKS

REFERENCE TO RELATED APPLICATIONS

This application claims priority of U.S. Provisional Patent Application Ser. No. 60/203,971, filed May 12, 2000, and is a continuation-in-part of U.S. patent application Ser. No. 09/560,595, filed Apr. 28, 2000 now U.S. Pat. No. 6,449,066. The entire contents of both applications are incorporated herein by reference.

FIELD OF THE INVENTION

This invention relates generally to optical elements and, in particular, to multiplexed gratings and combination grating/prism devices for use DWDM optical telecommunications networks.

BACKGROUND OF THE INVENTION

Optical telecommunications over optical fibers is now the preferred mode of high-bandwidth data transmission in comparison to copper wire, particularly over long distances. Such systems use lasers modulated in amplitude by the data to be transmitted. The signals are coupled into an optical fiber for detection and demodulation at the other end of the link.

The existing infrastructure of long-haul optical fiber is rapidly becoming taxed to its bandwidth capacity. Laying more fiber to carry additional bandwidth is an extremely expensive proposition. Dense wavelength-division multiplexing (DWDM) has emerged as a more cost-effective solution. The idea is to force existing fibers to carry more bandwidth by combining signals from multiple lasers operating at different wavelengths onto a single fiber. Optical multiplexers take optical signals at different wavelengths propagating on different fibers and combine them onto a single fiber. Optical amplifiers based on pumped erbium-doped fibers amplify the entire set of multiplexed optical signals on a fiber for transmission over long distances.

A critical element of a DWDM optical network is the Optical Spectrum Analyzer (OSA), which monitors the spectral content of optical signals propagating on a fiber. The OSA measures the presence, wavelength position, amplitude, and signal-to-noise ratio of all of the optical signals being carried on a fiber. The input to the OSA is normally a small fraction of the light within the fiber being monitored, picked off by a fiber tap coupler. The OSA measurements are essential to maintaining the integrity of the optical network by monitoring its essential functions. OSAs are also used in feedback loops to dynamically adjust amplifier gain profiles, so that all of the optical signals within the fiber can be maintained at the same amplitudes.

Two different wavelength bands for DWDM are currently in use: the "C-band" (central or conventional—approximately 1530 to 1565 nm) and the "L-band" (long wavelength—approximately 1575 to 1610 nm). These bands are largely defined by fiber and amplifier technologies. Up to approximately 100 different wavelength channels, each separated by 50 GHz (approximately 0.4 nm) may be multiplexed onto a single fiber in either band.

It is possible for C-band and L-band equipment to co-exist at a common network node. In these installations, a dual-band OSA can provide required functionality at significantly lower cost than separate single-band OSAs. C-band and L-band signals usually exist on separate fibers at these nodes, although it is physically possible for them to coexist in a single fiber.

OSAs for DWDM network monitoring are currently available using two fundamentally different technologies: dispersive gratings, and scanning Fabry-Perot cavities. Scanning Fabry-Perot devices are available from Queensgate Instruments, Ditech Communications Corp., and Micron Optics, Inc. to name a few. These devices are basically tunable filters that scan the wavelength range of interest. They are available in versions that cover either a single band or both the L-band and C-band, depending on the free spectral range of the cavity design. A significant disadvantage of scanning Fabry-Perot OSAs is the fact that they have moving parts that must be actuated to generate the spectral scan. This has undesirable implications on long-term reliability, environmental durability, and calibration stability. Also, the spectrum of interest is acquired sequentially rather than simultaneously.

Dispersive OSAs use diffraction gratings to spatially separate the spectral components of light within the DWDM network. Grating-based OSAs come in at least three fundamentally dissimilar configurations. One is based on a scanned grating, wherein the grating angle is changed to bring a single wavelength to image onto a single detector. Scanned grating devices have similar inherent disadvantages for long-term, continuous use installations due to their moving parts. An advantage is that they can be scanned over wide wavelength ranges at fairly high resolution, including the full C and L bands in a single instrument. Due to reliability issues, scanned grating OSAs have been largely relegated along with scanning Fabry-Perot filters to laboratory test instruments.

The more robust forms of grating-based OSAs for network monitoring use stationary gratings in an "imaging spectrograph" configuration. That is, the grating spreads the spectrum angularly, and then a lens images the entire spectrum of interest onto an array of detectors, rather than a single detector. In this configuration, data for the entire spectrum is gathered simultaneously without any moving parts.

Two varieties of grating-based OSAs are available. One, shown schematically in FIG. 1, uses a holographic grating/prism of the type described in U.S. patent application Ser. No. 09/560,595 to provide extremely high angular dispersion in a very compact configuration with two simple lenses and a linear InGaAs detector array available from Sensors Unlimited and others. This system is characterized by a fold of the optical path through nominally 180°.

A similar device, made by JDS for L-band monitoring, uses a similar holographic grating/prism, but with a fold of the optical path through nominally 160°, yielding slightly lower dispersion. The fold angles and wavelength ranges are quite flexible in the design of the grating-based OSA. Either band may be accommodated in either geometry, and other geometries with proper adjustment of other system parameters such as lens focal lengths or detector size.

FIG. 3A shows a prior-art, single-band grating construction. The grating may be constructed as appropriate for use in either the C- or L-fold configuration, or any other configuration useful to DWDM monitoring or routing, with or without prisms. A further OSA configuration, made by Lucent Technology, uses a blazed fiber Bragg grating to angularly disperse the light directly out of the fiber for imaging onto a similar detector array. OSAs based on these varieties are available as either C-band or L-band devices, but not both simultaneously.

The main barriers to providing a dual-band version of the stationary grating OSA are: 1) the lack of moving parts to direct multiple spectral regions onto a common detector or array; 2) the resolution of the linear detector array, currently available in up to about 512 pixels; 3) the efficiency that a stationary grating can maintain over a wide range of wavelengths and angles; and 4) the desire to keep the system compact.

The detector resolution is probably the most significant limiting factor, because in either L-band or C-band, as many as 80 to 100 signal channels need to be monitored and well-resolved by the array. In order to accurately interpolate the center wavelength of each signal peak, more than one or two samples of each peak is required. If one tried to measure the positions of, say, 160 to 200 peaks in both bands with only, say, 256 detectors in a linear array, the signals could not even be separated due to the Nyquist limit (2 samples per signal), let alone an accurate estimation of wavelength position.

SUMMARY OF THE INVENTION

This invention resides in multiplexed grating and grating/prism devices, particularly suited to DWDM optical telecommunications networks. As a primary application, a device according to the invention may serve as a key element of an optical spectrum analyzer (OSA). Such a device may also be used as an element of a fiber multiplexer or demultiplexer, by replacing the described detector array with a fiber or waveguide array.

Slightly different versions of the current invention can be used to address both single- and dual-band configurations. In the latter case, a modified detector array would be used relative to a single-band OSA, and the grating orientations would be slightly different. In the former case, the only difference between the single-band OSA and the dual-band OSA is the holographic layers of the grating or grating/prism, and the addition of a fiber-optic switch. As a dual-band OSA covering the C- and L-bands, a device according to the invention may be used to replace two separate OSAs like those currently in production, at only a modest increase in cost relative to a single-band OSA.

BRIEF DESCRIPTION OF THE DRAWINGS

FIG. 3A shows a prior-art, single-band grating construction;

FIG. 3B shows a multiplex grating construction according to the invention; and

FIG. 4 shows a multiplexed C and L band OSA optical configuration according to the invention (160° fold).

DETAILED DESCRIPTION OF THE INVENTION

Figure 1:
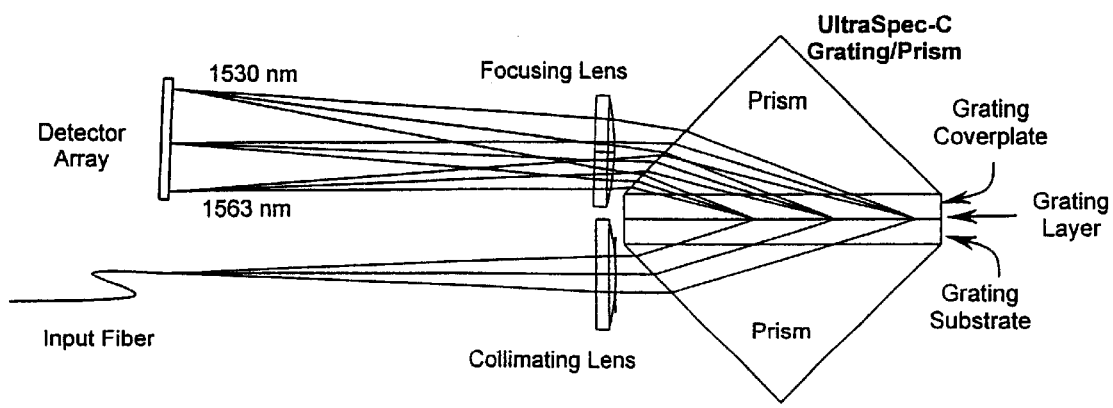
FIG. 1 is a schematic drawing of a prior-art C-Band OSA configuration using a holographic grating/prism with a 180° fold and grating frequency of 1853 lines/mm.
Figure 2:
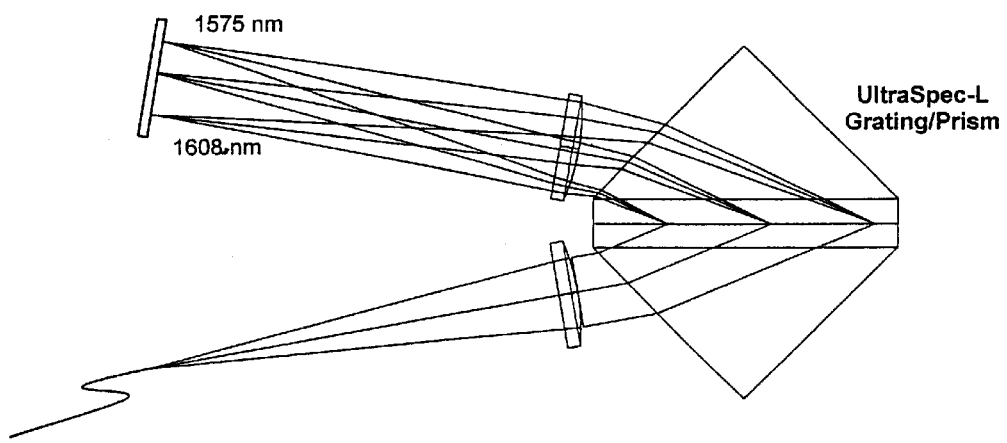
FIG. 2 is a schematic drawing of a prior-art L-Band OSA configuration using a holographic grating/prism with a 160° fold and grating frequency of 1793 lines/mm.

In certain respects, this invention extends the teachings of commonly assigned U.S. Pat. No. 5,559,597 entitled SPECTROGRAPH WITH MULTIPLEXING OF DIFFERENT WAVELENGTH REGIONS ONTO A SINGLE OPTO-ELECTRONIC DETECTOR ARRAY. In this spectrograph configuration, a multiplex holographic transmission grating utilizes two separate grating layers at different spatial frequencies. These two gratings are formed on different glass substrates and cemented together. In one embodiment, the gratings are rotated about the surface normal with respect to each other such that the dispersed spectra from the gratings are separated vertically on a two dimensional CCD detector array.

In the preferred embodiment of the current invention, two gratings are similarly cemented together at the grating plane of the grating/prism, as shown in FIG. 3B. One grating has the grating frequency and efficiency parameters tuned to disperse one band efficiently (the C-band, for example) through a range of angles for imaging onto a linear detector array. The other grating is appropriately configured to disperse another band of wavelengths (i.e., the L-band) through the same angles for imaging by the same lens onto the same linear detector array.

The following table lists the nominal grating frequencies required to multiplex C-band and L-band ranges in both the 180° and 160° fold geometries:

| Configuration[B]and | C-Band | L-Band |
|---|---|---|
| 180° Fold Configuration | 1853 l/mm | 1800 l/mm |
| 160° Fold Configuration | 1793 l/mm | 1742 l/mm |

Since the L- and C-bands generally exist on separate fibers, the gratings do not need to be rotated with respect to each other for spatial separation on the detector, as disclosed in the '597 patent referenced above. Rather, a fiber-optic switch is preferably used to select which fiber is to be analyzed, as shown in FIG. 4 (C or L Band), and software would be used to designate the appropriate calibration curve (wavelength vs. detector pixel position) for that band. In many OSA installations, a switch is already present to access multiple fibers carrying different traffic in the same wavelength bands. Note that to use the device to construct a dual-band DWDM multiplexer or demultiplexer rather than an OSA, the detector array elements are replaced by fiber-array or waveguide-array elements.

Further Alternative Embodiments

Simultaneous Multiplexing of L and C Bands that may be Combined on a Single Fiber In the case of an OSA, this would require a two-dimensional detector array, and the gratings would need to be rotated to split the two band images onto the different rows of the 2D array. In the case of a multiplexer, an appropriately configured 2D fiber array would be used.

Simultaneous Multiplexing of L and C Bands that are Fed in on Separate Fibers, Without Switching This configuration also uses a 2-D detector or fiber array, but the input fibers are displaced in the input plane (out of the plane of the illustration) so that the dispersed spectral images are dispersed onto different rows of detectors or fibers at the output plane. In this case, the two gratings do not need to be rotated with respect to each other.

Although specific wavelengths are called out herein, a plurality of wavelength ranges may be used through appropriate engineering modification apparent to those of skill in the art. The invention may also use any other fold geometry, including other fold angles with or without prisms. More than two transmission grating layers may also be used to accommodate more than two wavelength ranges.

We claim:

1. A multi-band optical system applicable to dense wavelength division multiplexing (DWDM), comprising:

a first transmission optical grating through which the "C" band of wavelengths in the range of approximately 1530 to 1565 nm transitions to a plurality of dispersed wavelengths at a fold angle;

a second transmission optical grating supported adjacent to the first transmission optical grating through which the "L" band of wavelengths in the range of approximately 1575 to 1610 nm transitions to a plurality of dispersed wavelengths at substantially the same fold angle; and wherein:

a) one or more optical fibers or waveguides carry each band of wavelengths to the gratings, and an optical detector converts the dispersed wavelengths into electrical signals for use as an optical spectrum analyzer;

b) one or more optical fibers or waveguides carry each band of wavelengths to the gratings, and a plurality of fibers or waveguides each receives one of the dispersed wavelengths from the grating for use as an optical demultiplexer, or c) a plurality of fibers or waveguides are carry used to carry separate wavelengths to the grating, and the grating combines the separate wavelengths an optical fiber or waveguide receives the non-dispersed band of wavelengths from the grating for use as an optical multiplexer.

2. The system of claim 1, further including:

a plurality of optical fibers or waveguides, each carrying one of the bands of wavelengths;

an optical switch coupled to the optical fibers or waveguides, thereby enabling dispersed wavelengths associated with the different bands to be selectively received by the optical detector using the same fold angle through the grating.

3. The system of claim 1, further including:

a plurality of optical fibers or waveguides, each carrying one of the bands of wavelengths;

a two-dimensional array of optical detectors; and wherein the gratings are configured so that the different wavelength bands fall onto different optical detectors of the array.

4. The system of claim 1, further including:

an optical fiber or waveguide carrying a plurality of wavelength bands;

a two-dimensional array of optical detectors; and wherein the gratings are configured so that different wavelength bands fall onto different optical detectors of the array.

* * * * *